Figure 1:
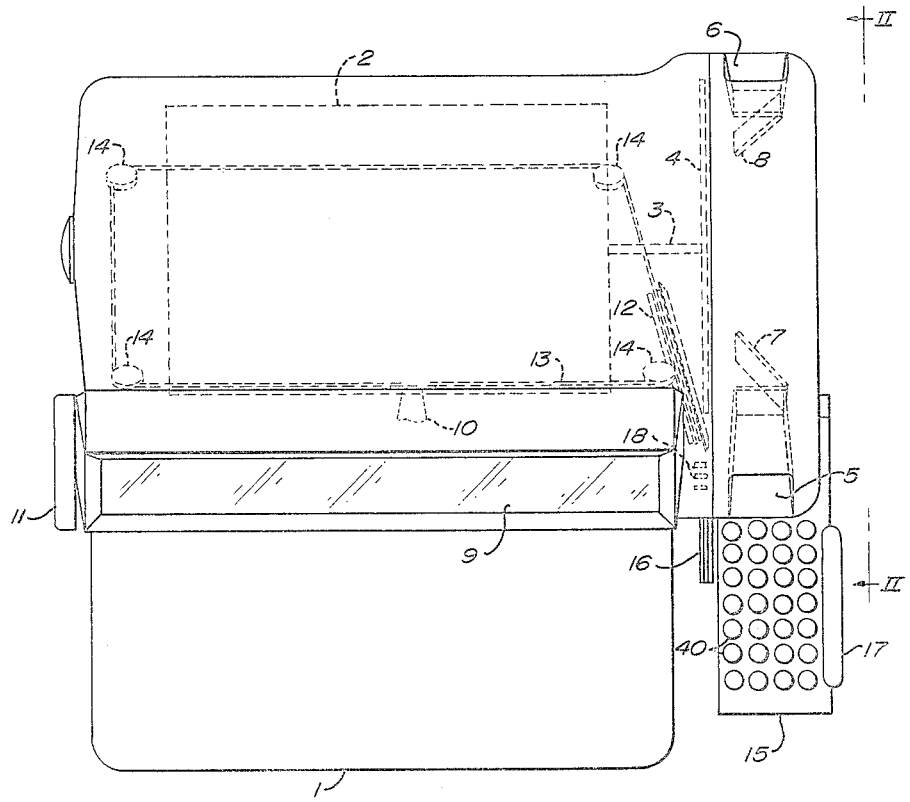

INVENTORS
ROBERT O. BRADLEY
FREDERICK C. CARROLL
ATTORNEYS

May 22, 1956
R. O. BRADLEY ET AL
2,746,384
PRINTING WEIGHING SCALE
Filed July 26, 1954
8 Sheets-Sheet 2
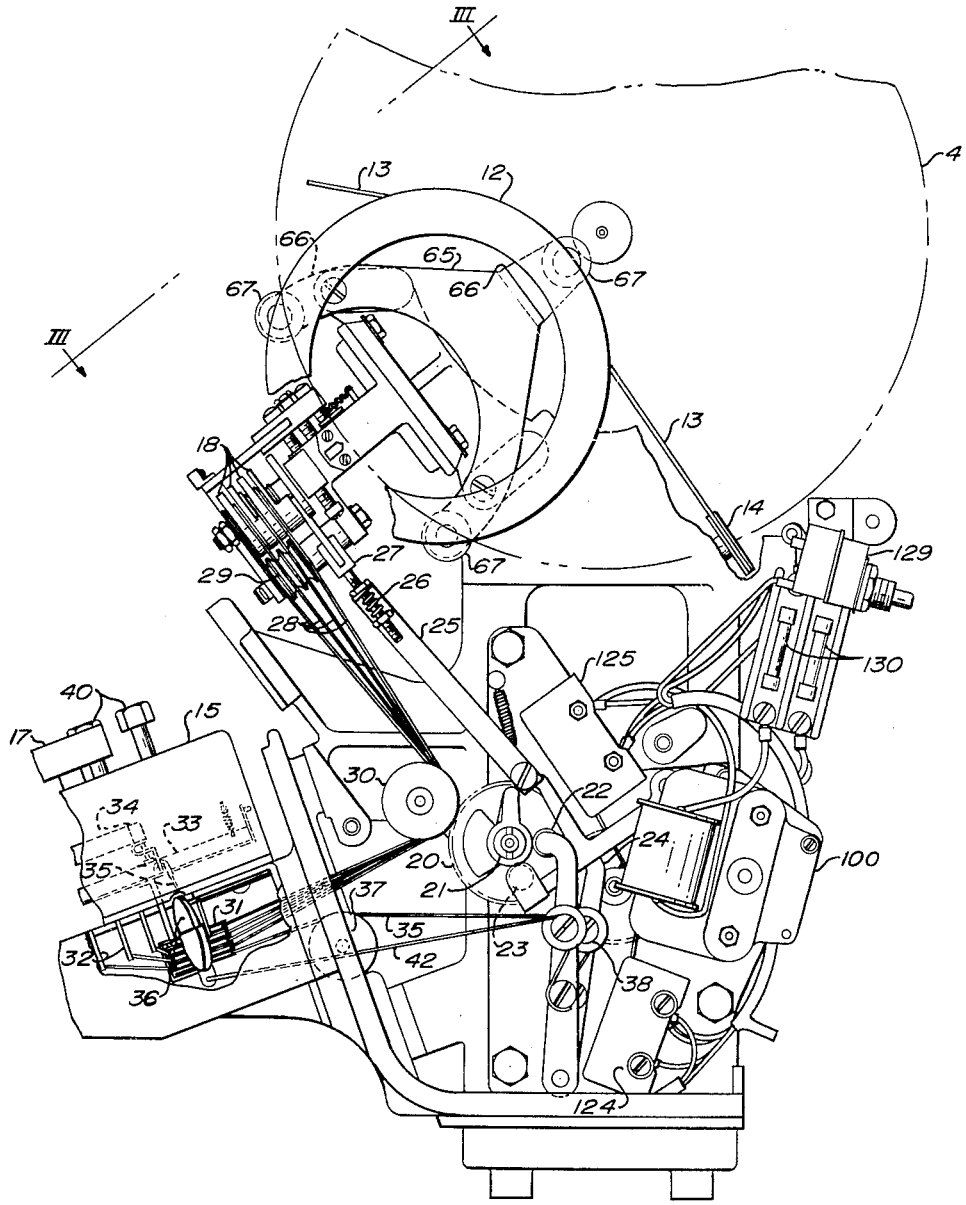
Fig. II
INVENTORS
ROBERT O. BRADLEY
FREDERICK C. CARROLL
BY
Marshall, Marshall & Hasting
ATTORNEYS

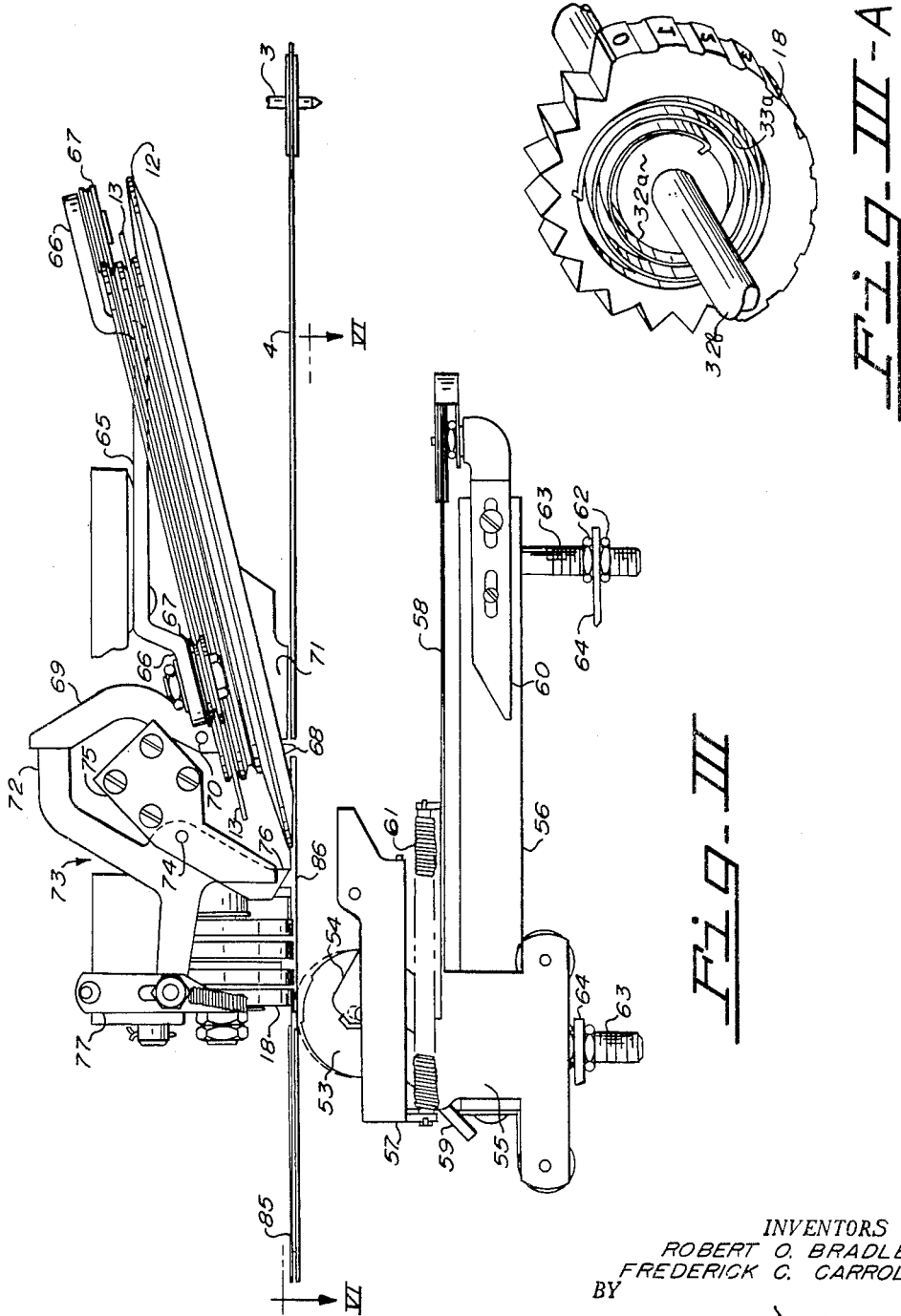

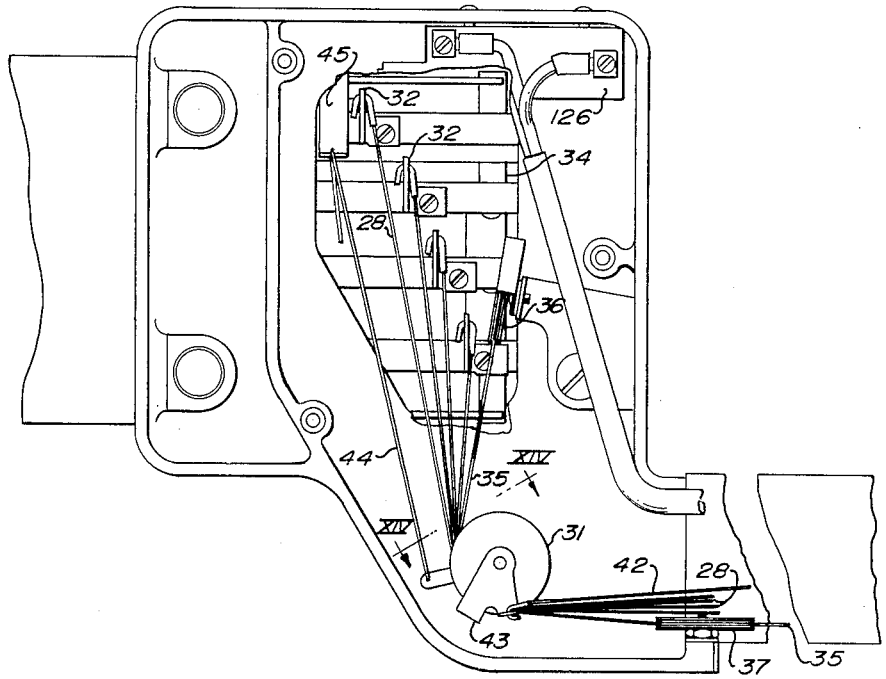
Fig. V
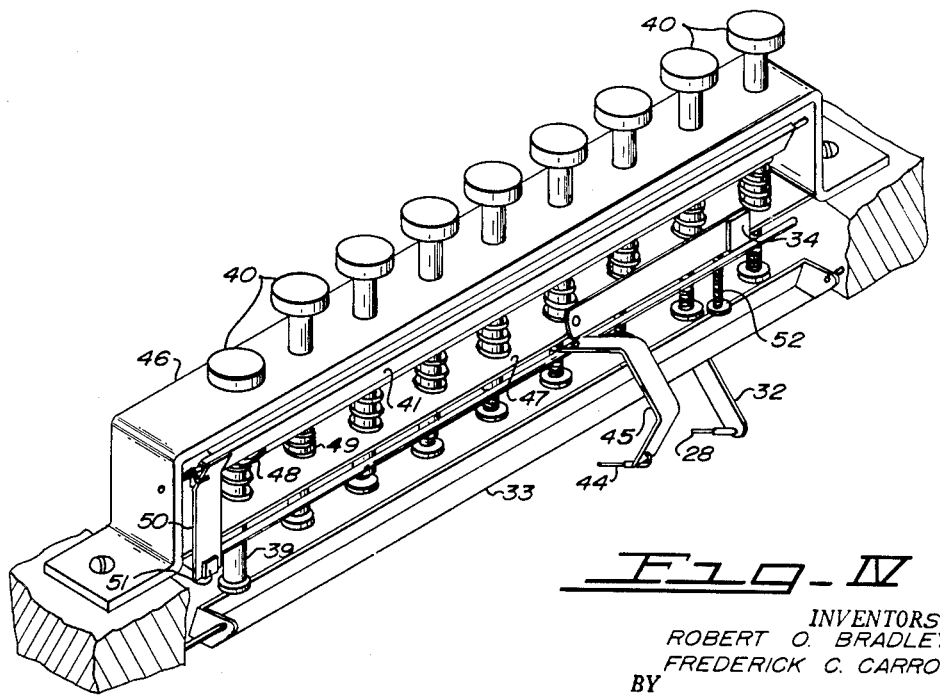
Fig. IV
INVENTORS
ROBERT O. BRADLEY
FREDERICK C. CARROLL
BY
Marshall, Marshall & Heating
ATTORNEYS

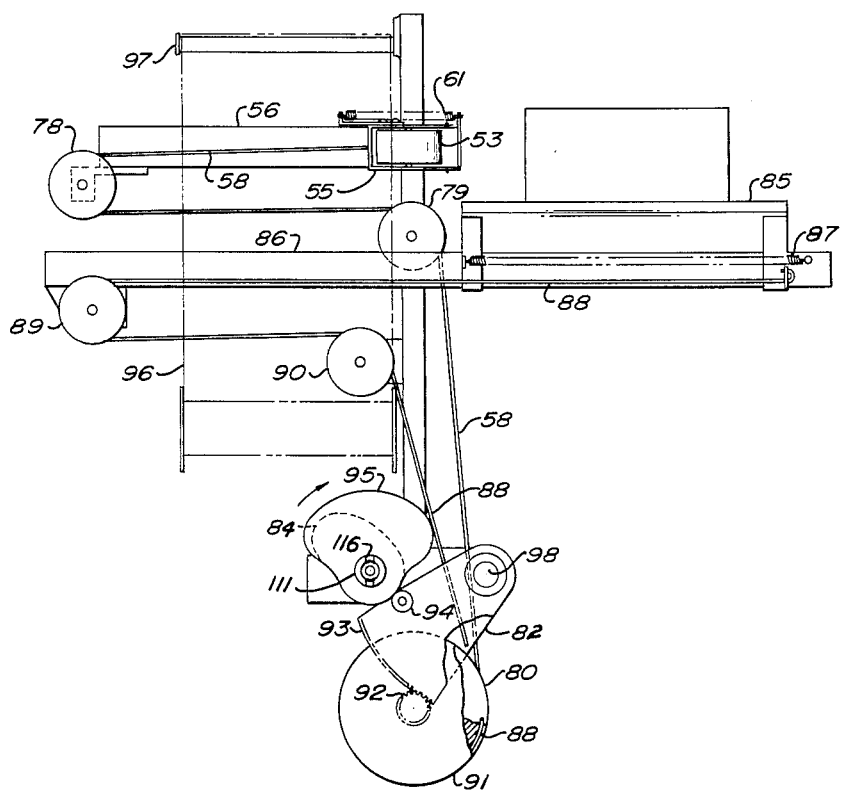
Fig-VI

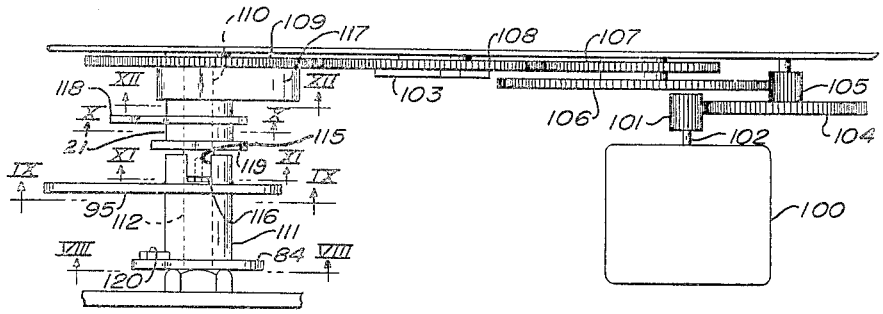
Fig. VII
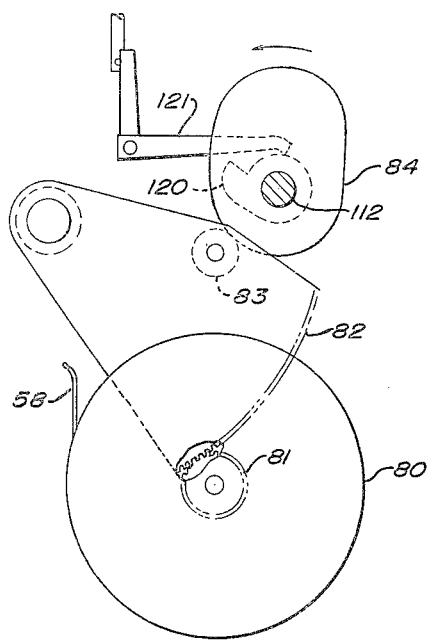
Fig. VIII
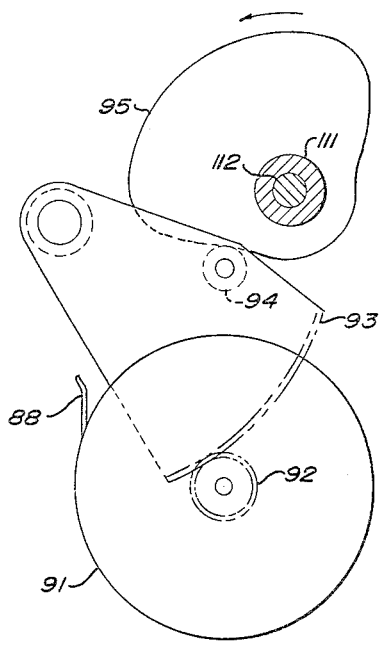
Fig. IX

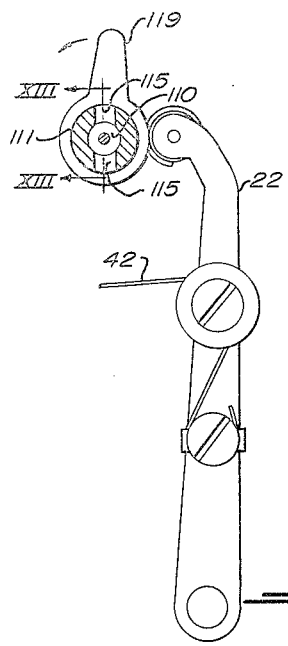
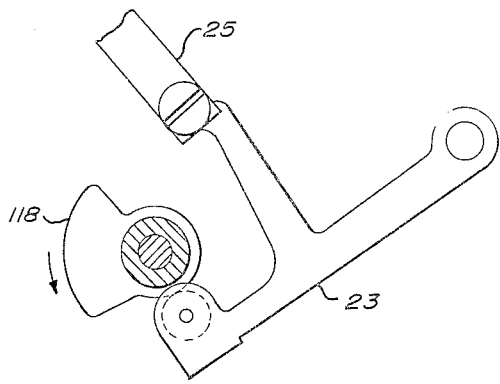
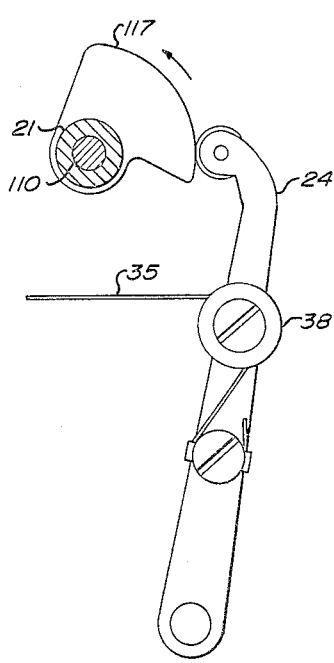
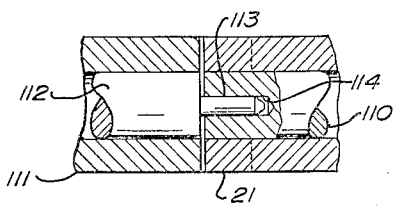
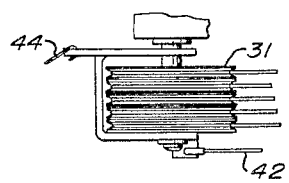

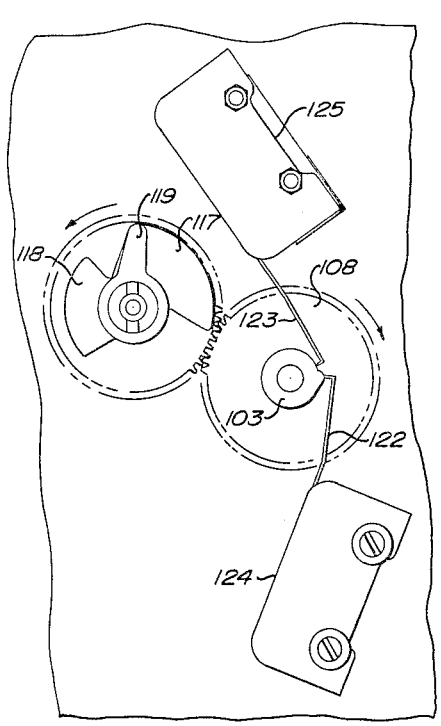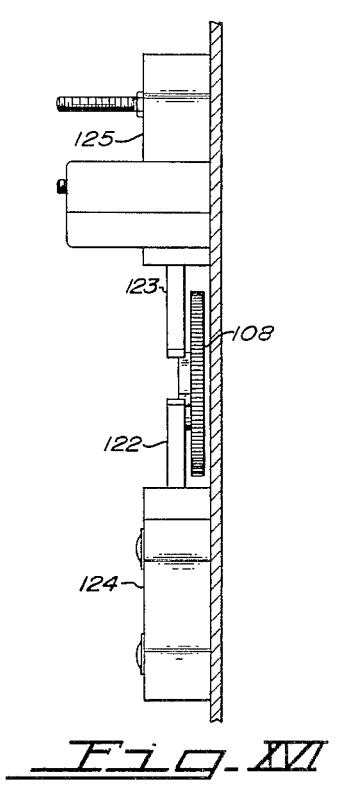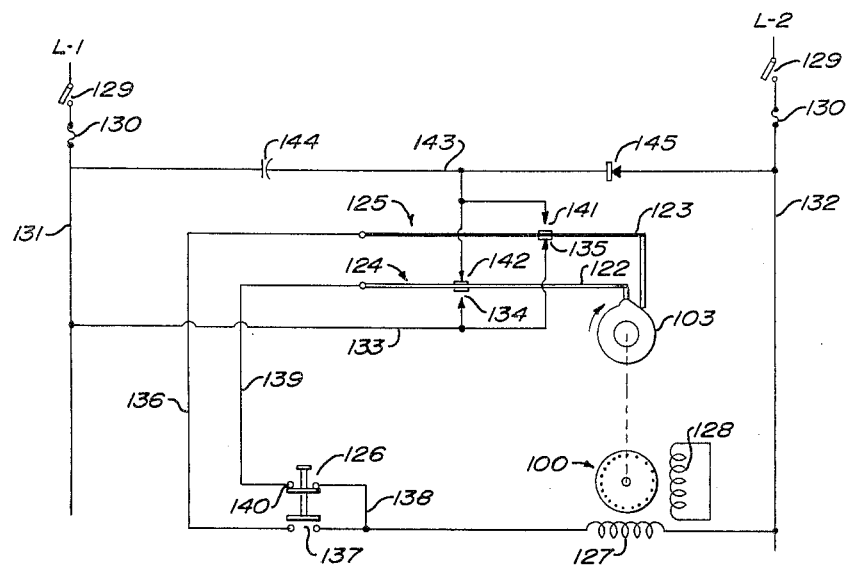

United States Patent Office 2,746,384
Patented May 22, 1956

2,746,384

PRINTING WEIGHING SCALE

Robert O. Bradley and Frederick C. Carroll, Toledo, Ohio, assignors to Toledo Scale Company, Toledo, Ohio, a corporation of New Jersey Application July 26, 1954, Serial No. 445,764

3 Claims. (Cl. 101—93)

This invention relates to weighing scales and in particular to improvements in a recording weighing scale adapted for use in retail trade and for use in prepackaging goods for sale in such trade. It specifically relates to improvements in the driving mechanism for the recording part of the scale.

Pre-packaging of produce requires that each package be weighed and marked because of the variability of prices and the impossibility of accurately sub-dividing some types of produce into predetermined uniform portions. For example, small packages of apples, peaches or other fruit cannot be adjusted in weight closer than 10 or 15% without extensive sorting of the fruit into precise weight groups. Likewise, cuts of meat, while they may be rendered more uniform by accurate cutting on the part of the butcher, vary in weight by such an amount that it is necessary to weigh and mark each package individually.

To meet this demand weighing scales equipped with computed price charts and printing mechanism have been developed for this pre-packaging operation.

The principal object of this invention is to provide improved driving mechanism for positioning type according to amount values registered in a keyboard and for moving a ticket into printing position and printing weight, price, and amount information on the ticket.

Another object of the invention is to provide improved means for positioning type wheels according to amounts set into a keyboard.

A still further object of the invention is to provide improved means for driving interconnected various separable parts of the equipment.

An ancillary object of the invention is to provide an improved motor control circuit that provides positive single cycle operation for each operation of a start bar.

A still further object of the invention is to provide motor operated means for setting up type wheels according to amounts registered by depression of keys of a keyboard.

These and more specific objects and advantages are apparent from the following description of a preferred embodiment of the invention.

According to the invention a printing weighing scale is equipped with motor operated means employing cams, cam followers and cord drives to operate a printing mechanism that records in juxtaposed or aligned figures the weight of an article placed on the scale, the amount to be charged for the package on the scale, and optionally, the price per unit of weight. The weighing mechanism is of the automatic type in which loads placed on the load receiver of the scale are counterbalanced by automatic counterbalancing means (such as a spring or pendulum) which drive a computed value chart and a weight printing chart to a position corresponding to the weight of the article. A viewing mechanism movable along the chart cooperates with the computed value indications to display to an operator the total amount to be charged for the package on the scale. A keyboard positioned alongside the load receiver is available for registering computed amount as read from the chart and a start bar adjacent the keyboard is, after the amount is registered and a ticket placed in a ticket slot, pressed to start the automatic recording and printing of the weight, price and computed amount. According to the invention the timing of the various operations is controlled by a set of cams and the various movements are performed by cord drives connected to followers bearing on the cams. One of the cams operates a pair of switches which in combination with the start bar switch control the operation of the motor to provide one revolution of the cams for each operation of the start bar.

A preferred embodiment of the invention is illustrated in the accompanying drawings.

In the drawings:

Figure I is a plan view of the improved weighing scale showing the general arrangement of the major component parts.

Figure II is an end elevation, as seen from the line II—II of Figure I, of the printing mechanism with the cover and ticket positioning and pressure applying means removed from the scale.

Figure III is in the nature of a fragmentary plan view, as seen from the line III—III of Figure II, showing the printing mechanism comprising the weight printing chart, the price printing member, type wheels, and the roller that applies pressure to the ticket to drive it against the type on the wheels, price member and weight member.

Figure III-A is an oblique view of one of the type wheels shown in Figure III illustrating a spring for urging the wheel in a direction to apply tension to its cord drive.

Figure IV is an isometric view of one bank of keys for the keyboard that cooperates with the type wheels.

Figure V is a bottom view of one end of the keyboard showing the connections of the cords that drive the type wheels.

Figure VI is a generally schematic view, as seen from the line VI—VI of Figure III, of the ticket positioning mechanism and the roller that applies the pressure to force the ticket against the type.

Figure VII is a schematic layout in the nature of a plan view of the motor, gearing, and cams that operate the various mechanisms.

Figure VIII is a fragmentary vertical section of the cam, cam follower and drive for the mechanism that operates the roller.

Figure IX is a similar vertical section showing the cam, cam follower and drive wheel that operate the ticket positioning mechanism.

Figure X is a similar vertical section showing the cam and cam follower that operate the means for locking the type wheels in position during a printing operation.

Figure XI is a similar vertical section showing the cam and cam follower that operate the mechanism for tripping or unlatching the keys of the keyboard after the type wheels have been locked in position.

Figure XII is a vertical section showing the cam and cam follower that operate the type wheel positioning mechanism according to the keys that have been depressed.

Figure XIII is a fragmentary section as seen from line XIII—XIII of Figure XI showing the piloting means holding the ends of the cam shaft axles in axial alignment.

Figure XIV is a fragmentary detail of a set of pulley sheaves as seen from the line XIV—XIV of Figure V.

Figure XV is a fragmentary elevation of the cam and switches for controlling the motor.

Figure XVI is a side elevation of the control switches as seen from the line XVI—XVI of Figure XV.

Figure XVII is a schematic wiring diagram showing the electrical connections for operating the motor that drives the cams.

These specific figures and the accompanying description are intended merely to illustrate the invention but not to impose limitations on the claims.

In a weighing scale constructed according to the invention a load receiver 1 adapted to receive and support packages to be weighed is operatively connected through a lever system and load counterbalancing mechanism, not shown, to a drum chart 2 mounted on an indicator shaft 3. The indicator shaft 3 also carries a disk chart 4, similar to the chart 22 shown in United States Patent No. 2,698,216 issued December 28, 1954, bearing printing indicia and viewing indicia that may be read through viewing openings 5 and 6 equipped with mirrors 7 and 8. Computed value indicia corresponding to weight of the article on the load receiver 1 and selected unit prices are displayed through a window 9 and a magnifying viewing device 10 which by means of a hand wheel 11 may be moved along the drum chart 2 so as to cooperate with any of a plurality of columns of computed value indicia.

In order to print price indicia corresponding to the position of the viewing device 10 a bevel-faced annular ring 12, shown as ring 28 in said patent and having price printing type characters formed on its bevel face, is mounted in partially overlapping relation to the disk chart 4 with its beveled face carrying the type coplanar with the outer face of the disk chart 4. The beveled annular ring 12 is mounted for rotation and is driven by a cord 13 attached to the viewing device 10 and guided over a plurality of pulleys 14.

In the operation of the scale the operator, having placed a package on the load receiver 1 and having positioned the viewing device 10 to cooperate with the selected price at which the package is to be priced, notes the computed value according to the indicia displayed in the viewing device 10 and records or registers such value on a keyboard 15 located to the right of the load receiver 1. Having registered the computed amount on the keyboard 15 the operator places a ticket in a ticket guide 16 and then pushes a start bar 17 to initiate the printing operation.

Upon the pressing of the start bar 17 the scale automatically moves the ticket in the guide 16 into printing position adjacent the face of the type bearing disk chart 4, the annular price printing member 12 and amount printing type wheels 18 and simultaneously positions the type wheels 18 according to the amounts registered on the keyboard 15. As the ticket reaches its printing station a roller pressure-applying element is moved across the ticket pressing it against an inked ribbon interposed between the ticket and the type bearing members so as to leave a printed impression on the ticket. As the roller completes its stroke and starts to move back the ticket is returned along the guide 16 to a position where it may be grasped and removed by the operator. As the ticket is returned the keys of the keyboard 15 which had been depressed and latched in position are released in preparation for another printing operation. Upon completion of these events the motor stops and awaits the next operation of the start bar 17.

Figure II illustrates part of the operating mechanism of the scale for printing records showing the weight, price and computed amount. As shown in this figure, a motor 100 is arranged to drive through a gear train ending with a gear 20 on a cam shaft 21. The cam shaft 21 carries three cams arranged to drive cam followers 22, 23 and 24 which are shown in detail in Figures X, XI and XII. The cam follower 23 acting through a link 25, overload spring 26, and connector 27 actuates mechanism to lock the type wheels 18 in printing position and at the same time through additional mechanism apply a brake to the edge of the disk chart 4 to prevent any movement of the disk chart during the printing cycle. The type wheels 18 prior to locking are rotated into printing position by cords 28 trained over a guide 29 and pulleys 30 and 31 and attached to downwardly depending arms 32 of rocker bars 33 of the keyboard 15. Each of the type wheels 18 is journaled on bushings 32a (Figure III-A), the bushings in turn being sleeved over a stationary rod 32b. The rod 32b is threaded at both ends to receive a pair of nuts (see Figures II and III) which act to clamp the bushings together on the rod. The bushings cannot rotate on the rod because of their being clamped by the nuts. Rotation of the wheels is therefore around the bushings. Each type wheel 18 has a spiral spring 33a enclosed within a recess in the type wheel with one of its ends connected to the bushing 32a and the other end connected to the type wheel for urging the type wheel in a direction to apply tension to its cord 28. In the normal position of the apparatus, that is the position occupied by the parts between printing operations, the type wheels 18 are drawn to a point corresponding to the number 9 or slightly beyond that point by force applied to the rocker bars 33 (see Figure IV) by a yoke 34 that is operated by a cord 35 trained over a pulley 36, around one of the sheaves of the pulley 31, over a pulley 37 and attached to a fitting 38 on the cam follower 24. The cam follower 24 rests on a high part of its cam when the apparatus is at rest. Shortly after the start of a printing operation the cam follower 24 drops to a low part of its cooperating cam thereby releasing the tension in the cord 35 and permitting the rocker bars 33 to rock upwardly to positions determined by downwardly directed stems 39 of keys 40 of the keyboard 15. (See also Figure IV.) As the rocker bars move, the type wheels 18 connected to the bars by the cords 28 move to corresponding positions. The stems 39 of the keys 40 are adjustable and when the key is held latched in its depressed condition, as by a latch bar 41, the stems 39 limit the movement of the rocker bars 33 to exactly that required to properly position the associated one of the type wheels 18. Since the rocker bars 33 are held in their lowermost or retracted position by the cord 35 between printing operations the keys 40 may be easily depressed. Likewise it does not matter how rapidly a key is struck since only the key moves at this time. The latch bar 41 releases any depressed key when another is struck.

Toward the end of the printing cycle, after the type wheels 18 have been locked in position by operation of the link 25 and cam follower 23, the cam follower 22 is actuated to apply tension through cord 42 and a lever arrangement 43 to a link 44 attached to a trip arm 45 arranged, when actuated, to release the latch bar 41 of each of the decades of the keyboard 15.

The keyboard 15 is composed of several banks of keys, one such bank being shown in detail in Figure IV. Each of these banks of keys is similar in operating principle and in most of the component parts to the key-operating mechanism shown in United States Patent No. 2,656,787. As shown in Figure IV the keys 40 are slidably mounted in aligned holes of an upper member 46 and a lower member 47. Intermediate the members 46 and 47 each of the keys has a collar 48 adapted to cooperate with a latch bar 41. The cooperating portions of the collar 48 and latch bar 41 are such that the depression of any key releases any other key that might have previously been depressed. Springs 49 sleeved over each of the keys 40 and compressed between the lower member 47 and the collar 48 urges the keys upwardly. As shown in detail in the patent and also herein the latch bar 41 has an arm 50 cooperating with a common actuating member 51. The structure shown in Figure IV, i. e. one decade of the keyboard 15, differs from that shown in Patent No. 2,656,787 by the addition of the yoke 34 and the trip arm 45 for releasing the latched keys. As shown in Figure IV the yoke 34 includes, for each bank or decade, a downwardly directed stem 52 that bears on the rocker bar 33 and holds the rocker bar 33 free of the stems 39 of the keys 40 until the yoke 34 is released by the release of the cam follower 24. By holding the rocker bars 33 in their fully depressed condition by means of the yoke 34 during periods between printing cycles it is possible to depress any of the keys 40 without meeting the resistance of the springs of the type wheels 18 or the restoring springs for the rocker bars 33. This very materially reduces the effort required as well as protecting the mechanism from damage caused by excessively rapid operation of the keys 40.

Referring now to Figure III, which is a general diagrammatic view of the price member, the disk chart, the type wheels and the printing mechanism, the type bearing faces of the disk chart 4, the price member 12 and the type wheels 18 are aligned along the path of a ticket shuttle 85 running in the guide 16 so that a ticket placed in the shuttle is carried into printing position where it faces the type on the various members. Once placed in position it is pressed against the type faces by a roller 53 yieldably journaled in a swinging yoke 54 mounted in a carriage 55 that runs along a track 56. The yoke 54 is pivoted and cooperates with a latch, not shown, on a fixed member 57 so that, as the carriage 55 is pulled by a cord 58, a yoke 54 is brought to an erected position and the roller 53 presses the ticket against the type wheels, the price member 12, and, finally, the disk chart 4 as the carriage 55 travels along the track 56. When the carriage 55 reaches the end of its travel a tail piece 59 of the yoke 54 strikes a release cam 60 which tips the yoke 54 back to the relative position shown thereby relieving the pressure between the roller 53 and the ticket. The carriage 55 then returns under the action of a return spring 61 with the roller 53 disengaged from the ticket.

The position of the track 56 is controlled by adjustable nuts 62 threaded on stems 63 of the track and engaging opposite faces of a frame member 64.

Figure III also illustrates in greater detail the mounting for the price printing member, the annular ring 12, which mounting comprises a bracket 65 having three arms 66 offset from the plane of the bracket 65 and each carrying a grooved roller 67 arranged to engage one rim of circumferential V-grooves cut in a cylindrical portion of the annular member 12 to receive the drive cord 13. The grooved rollers 67 are spaced approximately 120° apart around the periphery of the annular member 12 so as to support it for easy rotation without possibility of binding. Figure III also illustrates a brake 68 that engages the periphery of the chart 4 during a printing operation. The brake 68 is a tooth-like portion of a lever 69 pivoted on a pin 70 and resiliently urged by spring, not shown, in a direction to engage the edge of the chart 4. The disk chart 4 is further supported during a printing operation by an abutment 71 against which the chart is pressed as the roller engages the ticket overlying the chart.

The brake 68 is held released by contact between the tail end of the lever 69 and a tail portion 72 of a detent lever 73 that is pivoted on a pin 74 in a bracket 75. The detent lever 73 has a sharpened edge 76 adapted to engage notches in the periphery of the annular price printing member 12 when the detent lever 73 is rotated counterclockwise from the position shown in Figure III. The detent lever 73 thus serves to accurately position the price printing member 12 so that its type aligns with the type on the type wheels 18 and index markers located in the spaces between the chart 4, price member 12, and type wheels 18.

The link 25 through the connection 27 and a bell crank lever, not shown, engages a drive member 77 attached to an arm of the detent lever 73 and arranged to rotate the detent lever 73 counterclockwise when the link 25 is drawn downwardly during a printing cycle.

The bell crank lever, which is not shown, is also provided with a sharpened edge adapted to engage notches in the peripheries of the type wheels 18 so as to align the type in exact positioning for printing. This aligning bar or detent bar cooperating with the type wheels 18 also serves to hold the wheels in position should the keys 40 be released before the printing operation is completed. The type wheels and detent mechanism for holding them in position is shown in greater detail in application Serial No. 186,433, filed September 23, 1950.

The drive for the carriage 55 carrying the printing roller 53 is illustrated in schematic form in Figure VI. This figure is a view looking from the type bearing members such as the chart 4, annular price bearing member 12, and the type wheels 18 toward the roller and its supporting mechanism. This is the same as looking to the right from a line generally following the parting line between the right hand cover or housing portion and the remainder of the housing as shown in Figure I. As shown in Figure VI the carriage 55 carrying the roller 53 is pulled along the track 56 by the cord 58 which is trained over a pulley 78 located at the end of the track 56 and then back parallel to its first run to a second pulley 79 and then downwardly to a drive pulley 80 that is mounted on a hub of a gear 81 that meshes with a gear sector 82, see also Figure VIII. The sector 82 is equipped with a cam follower 83 engaging a drive cam 84.

It should be noted that Figures VI and VIII are reversed left for right since Figure VI is a view looking toward the printing mechanism from the type wheel locations while Figure VIII is a vertical section or a diagrammatic view of the cam follower and pulley drive as seen from the right end of the scale as seen in Figure I.

Figure VI also shows the equipment for transporting the ticket from an exposed position in the ticket guide 16 into printing position and then returning it after printing to the exposed position where the operator may remove it from the ticket guide 16. This ticket moving equipment comprises a ticket carriage 85 that is mounted on a track 86. The track 86 extends along and is housed within the ticket guide 16 as seen in Figure I. The carrier is urged toward the right hand end of the track 86, as seen in Figure VI, by a helical return spring 87 and is drawn into printing position by a cord 88 trained over pulleys 89 and 90 and attached to a drive pulley 91. The drive pulley 91 is mounted on a hub of a pinion gear 92 that meshes with a sector gear 93. The sector gear 93 includes a cam follower in the form of a roller 94 that engages the periphery of a drive cam 95. These parts are also shown in greater detail in Figure IX.

The cams 84 and 95 rotate clockwise as seen in Figure VI and are shown in the positions occupied just after the start of a printing cycle. As the cams rotate from the position shown, the cam 95 first drives the sector gear 93 in substantially harmonic motion to draw the ticket carriage 85 from its retracted position to its position within the printing station. As the ticket reaches its printing position the rise of the cam 84 acting on the sector gear 82 drives the roller carriage 55 and roller 53 across the ticket to form the impression of the type then presented to the ticket. As the high spots in the cams 84 and 95 pass the respective rollers on the sector gears the cords are released and the ticket carriage and the roller carriage are both returned to their original positions under the influence of the return springs 61 and 87.

Figure VI also indicates in general the path of an inked ribbon 96 that is interposed between the type on the chart 4, annular price member 12 and type wheels 18 and the ticket itself during the printing operation. The inked ribbon 96 is trained over guides 97 one of which is shown in the figure. A drive mechanism connected to a shaft 98 journalling the sectors 82 and 93 is arranged through ratchet gearing to advance the inked ribbon 96 stepwise a small distance as each ticket is printed.

The general arrangement of the drive mechanism from the source of power to the cams is illustrated in Figure VII. The printing mechanism is powered by the small induction motor 100 having a pinion 101 on its armature shaft 102. The motor 100 drives a first cam shaft 103 by means of a gear train starting with the pinion 101 and including a gear wheel 104, a second pinion 105, a second gear wheel 106, and a third drive gear 107 that meshes with a fourth gear 108 on the cam shaft 103. The fourth gear 108 meshes with and drives a fifth gear 109 that is fast on the cam shaft 21. The cam shaft 21 is hollow, in the form of a sleeve, and is journaled on a stationary axle or stud 110 attached to the frame of the scale. A second cam shaft 111 carrying the cams 84 and 95 is journaled on a stationary axle 112 of the frame carrying the roller track 56 and ticket carrier track 85.

The axles 110 and 112 as may be seen in Figure XIII, are held in axial alignment by a tenon 113 of the stationary axle 112 that engages a drilled hole 114 in the end of the first axle 110. The juxtaposed end of the hollow cam shaft 21 is fitted with a tenon or lug 115 that engages a mating notch 116 in the end of the cam shaft 111. As is indicated in Figure XI the tenon 115 if it were not for the bore through the cam shaft 21 would extend diametrically across the end of the cam shaft. The ends of the tenon 115 are of unequal circumferential extent so that the two cam shafts 21 and 111 will only engage in one relative angular position of the cams. This maintains the proper synchronization when the printer is attached to the scale. In Figure XI the ends of the second cam shaft 111 are shown in section, the section line being taken across the extreme end of the first cam shaft 21 to show the axially extending tenons 115 that fit between or into the notches in the end of the second cam shaft 111.

The first cam shaft 21 carries, next to the gear 109, a first cam 117 that cooperates with the cam follower 24 that one which holds the rocker bars of the keyboards 15 depressed until the start of the printing operation. This cam is shown in outline in Figure XII.

Next along the cam shaft 21 is a cam 118 which, as may be seen in Figure X, cooperates with the follower 23 to drive the link 25 and the locking means for the type wheels.

A third cam 119 on the cam shaft 26 (shown in Figure XI) cooperates with the cam follower 22 to operate the tripping mechanism that unlatches the depressed ones of the keys 40 of the keyboard 15 at the completion of the printing part of the cycle.

Next in order after crossing the joint between the cam shafts 21 and 111 is the cam 95, shown in Figure IX, that cooperates with the sector gear 93 and drive pulley 91 to operate the ticket carrier 85.

The second cam shaft 111 also carries the cam 84, shown in Figure VIII, that drives the carriage 55 for the roller 53. The cam 84, on its side, has a projection 120 that cooperates with a bell crank follower 121 and other mechanism, not shown, which operates a ticket clamp included in the ticket carrier 85.

It will be noted that each drive comprises a cam operating a follower which in turn draws a cord against a spring return so as to stretch the spring during the positively driven portion of the stroke. One of the features of the invention is the timing or sequencing of the various steps or operations in the printing cycle so as to distribute more or less evenly the load on the cams and thus reduce the peak power required from the motor. While the maximum tension in the various cords varies widely from cord to cord it is noted that the cord 35 which runs from the follower 24 to the yoke 34 cooperating with the rocker bars 33 is the most highly stressed of all the cords. The cord 42 operating the tripping mechanism by way of the link 44 requires but little force to accomplish the tripping action. Likewise, the force required to lock the type wheels in position and apply the brake to the chart 4 is moderate thus imposing only a moderate load on the cam 118. The roller and ticket carrier drives, the cams 84 and 95 are loaded a little more heavily than the cam 118 but not nearly as much as the cam 117 of the rocker bar control.

To distribute the load the operations are staggered or sequentially performed so that only one of the return springs is being stretched at a time. Where possible the force of one spring is balanced against another. Thus following a cycle of operations which starts in a position slightly in advance of the positions shown by the cams in Figures VIII, IX, X, XI and XII the first operation is the release of the bell crank lever 121 as the projection 120 drops the lever 121 at the start of the stroke. A moment later the cam 95 engaging the roller follower 94 starts the travel of the ticket carrier 85. As the velocity of the ticket carrier reaches its maximum which means maximum loading on the cam 95, the follower 24 drops off the trailing portion of the cam 117. It will be recalled that this cam follower applies the greatest force to the cams and thus as the cam follower drops off the trailing edge of the cam 117 a fairly large torque is applied to the cam shaft urging it forwardly.

As the follower 24 reaches its base circle and the follower 94 of the ticket carrier drive reaches the outer level of the cam 95 the roller drive cam 84 begins its stroke to advance the printing roller. At the same time as the follower 24 drops toward its base circle and releases the rocker bars 33 to position the type wheels 18, the cam 118 starts to drive the follower 23 to apply the brake to the chart and lock the type wheels. This action is timed from the release of the rocker bars to give the type wheels time to reach their printing positions as determined by the keys 40 before the centering and locking means engage the type wheels. This is controlled by the relative positioning of the cams 117 and 118.

The electrical controls for the motor 100 in order to provide for a single revolution of the cam shafts is illustrated in Figures XV, XVI, and XVII. As shown in Figure XV a raised part of the cam shaft 103 carrying the intermediate or fourth gear 108 engages a pair of switch operators 122 and 123 of switches 124 and 125, respectively. The cam shaft 103 turns clockwise as seen in Figure XV so as to operate the switch 125 slightly in advance of the operation of the switch 124. The switches 124 and 125 as well as a start switch 126 (shown in Figure V) operated by the start bar 17 are each single-pole double-throw. These switches are shown schematically in Figure XVII along with the interconnections between the switches and the motor 100. The motor 100 is preferably a shaded pole induction motor having a main field winding 127 and a short circuited shaded pole winding 128. In the circuit, as illustrated in Figure XVII, alternating current power from leads L1 and L2 is fed through a disconnect switch 129 operated by the cover of the housing for the printing mechanism so as to be closed as long as the cover is in its closed position. From the switch 129 current flows through fuses 130 to leads 131 and 132. The lead 131 is connected through a branch lead 133 to a normally open contact 134 of the switch 124 and a normally closed contact 135 of the switch 125. The common terminal of the switch 125 is connected through a lead 136 to the normally open contact 137 of the start switch 126. A common terminal 138 of the switch 126 is connected to one side of the motor field winding 127, the other side of the winding being connected to the return lead 132. The common terminal of the switch 124 is connected through a lead 139 to the normally closed contacts 140 of the start switch 126. The normally open contact 141 of the switch 125 and the normally closed contact 142 of the switch 124 are connected together and through a lead 143 and condenser 144 to the supply lead 131. These contacts are also connected through the lead 143 and a rectifier 145 to the return lead 132.

When the motor and cam shaft 103 are in the position shown, the main field winding 127 of the induction motor 100 is energized with combination of direct current and half wave alternating current as provided by the combination of the condenser 144 and rectifier 145. The direct current path may be traced from the lead 143 through the contacts 142 of the switch 124, the lead 139, the normally closed contacts 140 of the start switch 126, the field winding 127, the return lead 132 and the rectifier 145. Alternating current is supplied to this circuit by way of the condenser 144. This combination of currents flowing in the field winding 127 causes the motor 100 to stall without coasting.

When the cam operated switches are in this position and the start switch 126 is pressed to close its contacts 137 current flows directly from the supply lead 131 through the contacts 135, lead 136, now closed contacts 137, and main field winding 127 of the motor to the return lead 132. There is no direct current flowing through the motor at this time so that the motor develops full torque to start the cycle of operations. As soon as the motor rotates through a small travel the contacts 134 are closed and the contacts 142 are opened so that regardless of which position the start switch 126 may take alternating current is fed directly to the motor field winding 127. Thus the current may flow either through the contacts 134, lead 139 and contacts 140 if the start swich is released or through contacts 135, lead 136 and contacts 137 if the start switch is held closed.

Assuming normal operation, the start switch is released soon after its operation so that the current path is by way of contacts 134 and lead 139. In this case, contacts 137 are open so that the switch 125 has no effect upon the operation of the motor. Therefore, there is no change in motor control when the high point of the cam shaft 103 raises the switch operator 123 so as to open contacts 135 and close contacts 141. A moment later after the switch 125 has returned to its normal condition the switch operator 122 is lifted by the high point of the cam so as to open the energizing circuit to the motor at contacts 134 and immediately close contacts 142 so as to supply a pulse of direct current through the field winding 127 and maintain a flow of rectified current thereafter. The pulse of direct current from the condenser 144 flowing through the field winding 127 rapidly decelerates the motor 100 and brings it to a stand still.

If the operator holds the start bar 17 down so as to hold the start switch 126 in operated condition the motor operates under control of the switch 125. In this event the high point of the cam 103 by raising the switch operator 123 breaks the circuit to winding 127 upon opening the contacts 135 and supplies the pulse of direct current to stop the motor as the contacts 141 close. The motor thereupon stops a short time earlier in the cycle and awaits the release of the start bar 17 and closure of the contacts 140. As soon as the start bar is released the motor is again energized under the control of the switch 124 and runs the short remaining distance to the starting point for the next cycle.

The provisions of the two switches 124 and 125 in the control circuit for the motor 100 prevents continuous operation of the motor should the operator hold the start bar 17 depressed. This control circuit thus prevents multiple prints from a single operation of the start bar 17.

The various combinations of cams, cam followers, cord drives and switches make possible a convenient, reliable and easily manufactured mechanism for printing automatically in juxtaposed position figures indicative of the weight of a commodity placed on the load receiver of a scale, the price per unit weight as selected by the operator in positioning his reading device, and the computed amount or value of the article as read by the operator from the computed value chart and entered on the keyboard 15.

Various modifications in specific details of construction and arrangement of the parts of the structure may be made without departing from the scope of the claims.

Having described the invention, we claim:

1. In a printing weighing scale in which weight responsive means positions a computed value drum and weight printing type and amount printing wheels are operatively connected to a keyboard to set up type according to computed amounts entered on the keyboard, in combination, a plurality of latchable keys for each decade of the computed amount to be printed, a stop member attached to each key, an offset rotatable bar for each decade extending along and adapted to engage the stop member of a selected one of the plurality of keys, a cord drive from each rotatable bar to the corresponding printing wheel for positioning the wheel according to the rotation of the bar, a cross bar extending transversely of and engageable with the rotatable bars of the various decades for rotating all of the bars to one limit of travel of the bars, a motor operated cam and follower and a cord drive from the follower to the cross bar adapted to hold the rotatable bars at said one limit of travel, spring means for urging the printing wheels and bars away from said limit of travel, said cam being shaped to maintain tension in the cord drive to the cross bar from the end of one printing cycle until the start of a next printing cycle, whereby the rotatable bars are held free of the key stops prior to a printing cycle and are released to cooperate with the keys stops during the printing cycle.

2. In a printing weighing scale in which weight responsive means positions a computed value chart and weight printing indicia member, and a keyboard is operatively connected to type wheels mounted adjacent the weight printing member, in combination, a main frame supporting weight indicating means, type wheels and drives therefor, an auxiliary frame mounted on the main frame, ticket positioning and ticket printing means mounted on the auxiliary frame for cooperation with the type wheels and weight printing indicia member, a first stud on the main frame, a second stud on the auxiliary frame juxtaposed to the first stud, means on the juxtaposed ends of the studs for holding the ends coaxial, a hollow cam shaft sleeved over each stud, motor drive means on the main frame for driving the cam shaft on the first stud, said cam shafts having interengaging ends whereby one drives the other, and cam followers on said frames cooperating with the cams for driving the type wheels, ticket positioning and ticket printing means.

3. In a printing weighing scale having a weight printing and computed amount indicating member driven by load responsive means, amount printing type wheels located adjacent the weight printing members, and a manually operable keyboard mounted on the scale, in combination, a rotatable bar extending beneath each row of keys of the keyboard, the bar being pivoted to rotate about an axis parallel to and offset from a plane through the bar and the row of keys, a stop member on each key engageable with the bar when the key is in depressed position, means operatively connecting each rotatable bar to a corresponding type wheel, means continuously urging each type wheel in a direction to draw the connected rotatable bar against a key stop member, a motor, a cam driven by the motor and adapted to make one revolution for each printing cycle, a follower for the cam, and means connecting the follower to the rotatable bars to hold said bars clear of the key stop members between printing cycles.

References Cited in the file of this patent

UNITED STATES PATENTS

| | | |
|---|---|---|
| 1,749,192 | Osgood | Mar. 4, 1930 |
| 1,911,356 | Eames | May 30, 1933 |
| 1,993,577 | Von Pein | Mar. 5, 1935 |
| 2,068,036 | Orling | Jan. 9, 1937 |
| 2,119,205 | Doyle | May 31, 1938 |
| 2,631,529 | Bernhardt | Mar. 17, 1953 |
| 2,661,683 | Beattie | Dec. 8, 1953 |

FOREIGN PATENTS

| | | |
|---|---|---|
| 412,439 | Great Britain | June 28, 1934 |